United States Patent
Tao et al.

(10) Patent No.: US 10,588,195 B2
(45) Date of Patent: Mar. 10, 2020

(54) TUBULAR DEVICE FOR FITTING TO A TUBULAR LIGHT FITTING

(71) Applicant: SIGNIFY HOLDING B.V., Eindhoven (NL)

(72) Inventors: Haimin Tao, Eindhoven (NL); Yi Wang, Eindhoven (NL); Huojun Long, Eindhoven (NL)

(73) Assignee: SIGNIFY HOLDING B.V., Eindhoven (NL)

(*) Notice: Subject to any disclaimer, the term of this patent is extended or adjusted under 35 U.S.C. 154(b) by 0 days.

(21) Appl. No.: 16/087,937

(22) PCT Filed: Apr. 4, 2017

(86) PCT No.: PCT/EP2017/057942
§ 371 (c)(1),
(2) Date: Sep. 24, 2018

(87) PCT Pub. No.: WO2017/174555
PCT Pub. Date: Oct. 12, 2017

(65) Prior Publication Data
US 2019/0116643 A1    Apr. 18, 2019

(30) Foreign Application Priority Data

Apr. 6, 2016  (WO) ................ PCT/CN2016/078564
May 12, 2016  (EP) .................................... 16169289
Nov. 10, 2016  (EP) .................................... 16198203

(51) Int. Cl.
*F21V 25/02*     (2006.01)
*F21V 25/04*     (2006.01)
(Continued)

(52) U.S. Cl.
CPC ........... *H05B 33/0884* (2013.01); *F21K 9/27* (2016.08); *F21K 9/278* (2016.08); *F21V 23/04* (2013.01);
(Continued)

(58) Field of Classification Search
CPC ............ H05B 33/0803; H05B 33/0884; H05K 1/0257; H05K 1/0256; H05K 9/0064;
(Continued)

(56) References Cited

U.S. PATENT DOCUMENTS 4,912,371 A    3/1990  Hamilton
5,023,521 A *  6/1991  Sridharan, Sr. ...... H05B 41/046
                                                       315/247
(Continued)

FOREIGN PATENT DOCUMENTS

EP    2381158 A2    10/2011
FR    2664741 A1    1/1992
(Continued)

OTHER PUBLICATIONS

Teccor brand Thyristors, Littelfuse, Jun. 21, 2011, https://www.littelfuse.com/products/power-senniconductors/discrete-thyristors/triac/lx01ex-lxnx-gx01ex-gxnx/g401e4.aspx (Year: 2011).*

*Primary Examiner* — Wei (Victor) Y Chan
*Assistant Examiner* — Henry Luong
(74) *Attorney, Agent, or Firm* — Daniel J. Piotrowski

(57) ABSTRACT

The invention provides a solid state (e.g. LED) tubular lighting device having pin safety circuits connected to connecting pins at each end. A driver circuit is connected to the outputs of the pin safety circuits. The pin safety circuits each comprise a TRIAC switch which is adapted to form a closed switch in response to a voltage between the connecting pins. This provides a pin safety solution suitable at least for rapid start EM ballasts.

12 Claims, 6 Drawing Sheets

(51) Int. Cl.
*H05B 33/08* (2020.01)
*F21K 9/278* (2016.01)
*F21K 9/27* (2016.01)
*F21V 23/04* (2006.01)
*F21Y 115/10* (2016.01)
*F21Y 103/10* (2016.01)

(52) U.S. Cl.
CPC ...... *H05B 33/0806* (2013.01); *F21Y 2103/10* (2016.08); *F21Y 2115/10* (2016.08)

(58) Field of Classification Search
CPC .......... H05K 9/0066; H05K 2201/073; H05K 2201/0738; H05K 2201/0746; H05K 2201/0776; Y02B 20/386; F21K 9/27
USPC ......... 315/185 R, 187, 200 R, 291, 307–308
See application file for complete search history.

(56) References Cited

U.S. PATENT DOCUMENTS

| | | |
|---|---|---|
| 8,917,020 B2 | 12/2014 | Jans |
| 2006/0193131 A1* | 8/2006 | McGrath ............ H05B 33/0803 362/227 |
| 2012/0146089 A1 | 6/2012 | Menard et al. |
| 2012/0146513 A1 | 6/2012 | Radermacher |
| 2013/0093309 A1 | 4/2013 | Deppe |
| 2014/0055029 A1* | 2/2014 | Jans ........................ F21V 23/04 315/74 |
| 2015/0223303 A1* | 8/2015 | Hsia .................. H05B 33/0884 315/121 |
| 2015/0366008 A1* | 12/2015 | Barnetson .......... H05B 33/0809 315/200 R |

FOREIGN PATENT DOCUMENTS

| | | |
|---|---|---|
| WO | WO2013150417 A1 | 10/2013 |
| WO | WO2015074917 A1 | 5/2015 |
| WO | WO2016005344 A1 | 1/2016 |

* cited by examiner

TUBULAR DEVICE FOR FITTING TO A TUBULAR LIGHT FITTING

CROSS-REFERENCE TO PRIOR APPLICATIONS

This application is the U.S. National Phase application under 35 U.S.C. § 371 of International Application No. PCT/EP2017/057942, filed on Apr. 4, 2017, which claims the benefits of European Patent Applications Nos. 16198203.8, filed on Nov. 10, 2016, and 16169289.2, filed on May 12, 2016 and Chinese Patent Application No. PCT/CN2016/078564, filed on Apr. 6, 2016. These applications are hereby incorporated by reference herein.

FIELD OF THE INVENTION

This invention relates to tubular light fittings, and in particular to the tubular lighting devices which are received in such fittings.

BACKGROUND OF THE INVENTION

Solid state lighting (SSL) is rapidly becoming the norm in many lighting applications. This is because SSL elements such as light emitting diodes (LEDs) can exhibit superior lifetime and energy consumption, as well as enabling controllable light output color, intensity, beam spread and/or lighting direction.

Tubular lighting devices are widely used in commercial lighting applications, such as for office lighting, for retail environments, in corridors, in hotels, etc. A conventional tubular light fitting has a socket connector at each end for making mechanical and electrical connection to connection pins at each end of a tubular light. Conventional tubular lights are in the form of fluorescent light tubes. There is a huge installed base of luminaires equipped with electronic ballasts for fluorescent light tubes. The ballast circuit is external of the light tube, and comprises a ballast (inductor) and a starter circuit. The ballast, starter circuit and the two pairs of connection pins from a closed circuit. In a conventional fluorescent light tube, a heating filament between the connection pins of each pair completes the circuit.

There are now tubular LED ("TLED") solid state lamps which can be used as a direct replacement for traditional fluorescent light tubes. In this way, the advantages of solid state lighting can be obtained without the expense of changing existing light fittings.

FIG. 1 shows a basic known tubular solid state lamp 10, comprising a tubular housing 12 having an end cap 14 at each end (only one is shown). The end cap 14 carries external connectors 16 in the form of two pins offset to each side from a central axis of the end cap 14, parallel to an elongate axis 15 of the tubular housing 12. The end cap 14 connects electrically to the internal driver board and the circuit board which mounts the solid state lighting elements, for example LEDs, inside the tubular housing 12.

FIG. 2A shows the basic circuit of a standard fluorescent light tube luminaire. It comprises a glow starter 17, ballast 18 and the mains AC source 19. Together with filament wires bridging the pairs of contact pins at each end of the tube 10, a closed circuit is formed. A basic electromagnetic (EM) ballast such as shown in FIG. 2A may operate at mains frequency, whereas an electronic ballast has electronic components to operate at a high frequency, such as 20 kHz.

FIG. 2A illustrates how it is safe to touch the non-connected end of the tube for a fluorescent light tube. A conventional fluorescent light tube can be inserted into such a live mains fixture without any danger because the connection pins on either side of the lamp are electrically insulated from each other by the glass tube of the lamp and the gas inside it. An electrical contact between the two ends of the lamp is only established if the gas inside it is ignited and this is only possible after both ends of the lamp have been inserted into the luminaire.

Taking the lamp out of the luminaire will immediately stop both the current flowing through it and the gas discharge in it and thus immediately re-establish electrical insulation between both ends of the lamp.

However, inserting a TLED lamp into a luminaire is potentially dangerous since it is possible to touch the connection pins on one end of the lamp whilst the other end of the lamp is already inserted and in contact with a hazardous voltage.

A typical TLED retrofit lamp contains LED PCBs and LED driver PCBs which offer little electrical insulation between the connection pins on both ends of the TLED. It may therefore be dangerous to insert such a TLED into a live mains fixture because there is a conductive path between the two ends of the tube.

Various pin safety measures have been proposed to overcome this safety issue. These pin safety measures usually interrupt the electrical connection between both ends of the TLED by at least one switch that is only closed when both ends of the TLED are inserted into the luminaire.

Both electrical and mechanical pin safety mechanisms are known.

In one known electrical pin safety solution, power is only taken from a first side of the tube and the other side is isolated from the first, and is arranged as a short between the two pin connections on that other side. The glow starter 17 (FIG. 2A) has to be replaced by a dummy starter with a bridging wire or a fuse inside, so that the loop for the current is closed.

This method has its limitations since it only works with lighting fixtures which contain a starter, these fixtures may be known as an electromagnetic (EM) fixture as they commonly utilize an EM ballast. (FIG. 2A). For the rapid starter fixtures (FIG. 2B and FIG. 2C) there are no starters in the circuit and therefore the dummy starter method does not work. For rapid starter fixtures, and for some other types of ballast, other pin safety solutions are required. Different territories have different preferred types of ballast although the use of other types of ballast in the territories is possible. For example, the North American region favors the T12 lamp with a rapid start ballast.

For example, in some other electrical pin safety solutions, an electromagnetic relay is closed when both ends of the TLED are inserted into the lamp holders in the luminaire. Insertion of the TLED into the luminaire is detected and the electromagnetic relay is closed using currents and voltages originating from the electronic ballast. An advantage of the relay pin safety solution is that it is fool-proof and maintains the look and feel of a normal lamp.

Issues related to electrical pin safety mechanisms are the compatibility with the large number of different types of electronic ballasts and the cost and reliability of electromagnetic relays.

In mechanical pin safety solutions, at each end of the TLED a switch is closed when pressing a button. Either the lamp holder will push the button when inserting the TLED into the luminaire or it needs to be pressed manually. This can be used for all types of ballasts, but it changes the way the TLED has to be installed, and it may not be compatible with all different luminaire and socket mechanical designs, since this depends on the button design and the luminaire and socket design.

As mentioned above, some electrical safety solutions may be suitable only for certain types of ballast. For example, providing the driver at one end only of the lamp may not be possible for high frequency (HF) electronic ballast (including rapid start electronic ballast) and for rapid start low frequency (EM) ballast. In particular, there is no way to place a dummy starter to close the circuit. A short at one end will also short out a heating voltage across the pins.

FIG. 2B shows a rapid start single lamp, and FIG. 2C shows a rapid start dual lamp. The lamps are for example T12 lamps (standard 38 mm diameter tubes).

The ballast in the rapid start configuration is based on an autotransformer 20, which converts the mains voltage to a suitable voltage for driving the lamp. Furthermore, its internal impedance regulates the lamp current. The ballast has heating windings, which provide current to heat the filament of the fluorescent light tube, thus reducing the lamp starting voltage and extending the lamp lifetime. The ballast usually also has an internal power factor compensation capacitor 22. There is no starter 17 needed in a rapid start fixture, which means the pin safety solution explained above in which a glow starter is replaced with a dummy starter cannot be applied and a new pin safety solution is required for the rapid start EM ballast.

U.S. Pat. No. 8,917,020 discloses a relay pin safety solution designed for rapid start EM ballasts (as commonly used in North America).

FIG. 3 shows the general configuration. The LED board 30 is connected to driver PCBs 32,34 at each end. The driver PCB 32 has a relay 32*a* and a driver circuit 32*b* and the driver PCB 34 has a relay 34*a* and a driver circuit 34*b*.

The relay contacts provide pin safety. The filament heating voltage (from the ballast) is converted to a dc voltage by a rectifier 32*c*, 34*c* and actuates the relay contact. The relay stays open until the lamp is fully inserted in the fixture. Therefore it is safe to touch the pins when the opposite side is inserted in the lamp holder and energized. There are two relays used in the lamps, one for each end.

This solution works well, but the drawback is that two relays are needed which gives rise to additional cost. A further complication is that there are certain variations on the filament heating voltage depending on ballast type and mains voltage variation. A most simple choice of rectifier is thus not able to guarantee a stable voltage to ensure that the relay contact is firmly closed.

An alternative design makes use of a relay and an optocoupler as disclosed in WO2013/150417. FIG. 4 shows the configuration.

Each end is coupled to a rectifier 40, 42. A single relay 44 is needed and an optocoupler 46 connects the two ends. The heating voltage at the left end is converted to a suitable voltage for driving the relay coil 44 for example by a boost converter 47. The heating voltage from the right end energizes the primary side of the optocoupler and the output of the optocoupler enables the relay coil voltage, so that the relay contacts closes. With such a circuit, the main current can only flow (under the control of the driver circuit 48) when both sides of the lamp are fully inserted in the luminaire. If only one side of the lamp is inserted, the relay coil will not receive a voltage and the open contact provides pin safety.

The additional power converter 47 stabilizes the relay coil voltage and thus provides reliable operation of the relay. This arrangement still needs a relay and associated control circuitry.

The existing solutions are thus expensive and large in size because of the relay component. Furthermore the relay has a limited switching lifetime because of the moving parts and contact surface damage due to arcing. The circuit required for controlling the relay is also complex.

There is therefore a need for an improved system for providing protection when fitting a TLED to a luminaire which can be implemented with low cost and reliable circuitry, and in particular which is functional for existing ballasts with electrode heating (i.e. rapid start) circuitry.

SUMMARY OF THE INVENTION

The invention is defined by the claims.

According to an aspect of the invention, there is provided a tubular lighting device, comprising:

a tubular housing having an elongate axis and first and second opposite ends, each end comprising two projecting electrical connection pins;

a first pin safety circuit electrically connected to the connecting pins at the first end and having a first power supply output terminal;

a second pin safety circuit electrically connected to the connecting pins at the second end and having a second power supply output terminal;

a solid state lighting arrangement; and a lighting driver circuit which is connected to the first and second power supply output terminals for receiving power from the first and second pin safety circuits, wherein the pin safety circuits each comprise a TRIAC switch having an input terminal, an output terminal and a gate terminal, wherein the input terminal is connected to one of the connection pins, the gate terminal is connected to the other of the connection pins and the output terminal is connected to the respective power supply output terminal, wherein the TRIAC is adapted to form a closed switch in response to a voltage between the input terminal and the gate terminal.

In this arrangement, pin safety circuits are provided at each end of the tubular LED lamp. They are based on a TRIAC circuit, which is therefore low cost and can be implemented in a small volume. Each TRIAC is gated by a voltage across the pins of the end connector. This voltage is a heating voltage generated by the ballast, and is for example a 3.6V rms signal. The device is thus suitable for use with a fluorescent lighting ballast in the form of a rapid start electromagnetic (mains frequency) ballast, or in the form of an electronic (high frequency) ballast with filament heating.

The gate terminal of the TRIAC of each pin safety circuit is preferably connected to the connection pin through a resistor. This provides conversion of the heating voltage to a gate current for controlling the gating of the TRIAC.

Each pin safety circuit may further comprise a capacitor and/or a resistor between the input terminal and the gate terminal of the TRIAC. This may be used to avoid unintentional triggering of the TRIAC.

The lighting driver circuit for example comprises a rectifier and a switch mode power converter for example a buck converter. The lighting driver circuit may further comprise an EMI filter.

The TRIAC of each pin safety circuit preferably comprises a four quadrant TRIAC. This enables correct operation regardless of the rotational orientation with which the lamp is connected to a luminaire.

According to a further aspect of the invention, there is provided a tubular lighting device, comprising:

a tubular housing having an elongate axis and first and second opposite ends, each end comprising two projecting electrical connection pins;

a first pin safety circuit electrically connected to the connecting pins at the first end and having a first power supply output terminal;

a second pin safety circuit electrically connected to the connecting pins at the second end and having a second power supply output terminal;

a solid state lighting arrangement; and a lighting driver circuit which is connected to the first and second power supply output terminals for receiving power from the first and second pin safety circuits, wherein the first pin safety circuit comprises an additional TRIAC switch having an input terminal, an output terminal and a gate terminal, wherein the input terminal is connected to one of the connection pins, the gate terminal is connected to the gate terminal of the first TRIAC switch and the output terminal is connected to a further respective power supply output terminal, wherein the TRIACs are adapted to form a closed switch in response to a voltage between the input terminal and the gate terminal.

The solid state lighting arrangement is preferably an LED arrangement.

The invention also provides a lighting fixture comprising:

a fluorescent lighting electronic ballast, a fluorescent lighting electromagnetic ballast, or a lighting fixture without a ballast; and a device as defined above fitted to the fluorescent lighting ballast.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a solid state (e.g. LED) tubular lighting device having pin safety circuits connected to connecting pins at each end. A driver circuit is connected to the outputs of the pin safety circuits. The pin safety circuits each comprise a TRIAC switch which is adapted to form a closed switch in response to a voltage between the connecting pins. This provides a pin safety solution suitable for rapid start EM ballasts and electronic ballasts with electrode heating.

Figure 1:
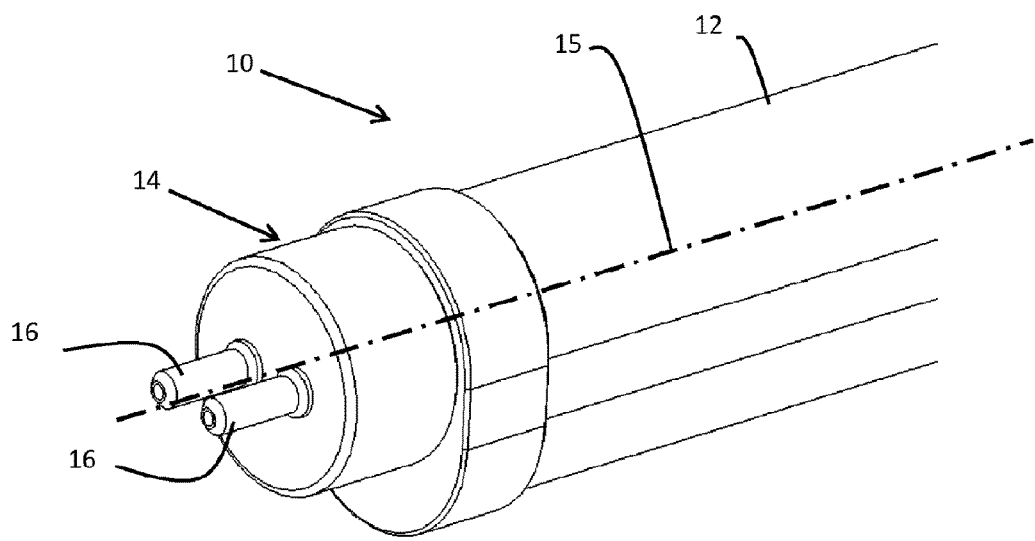
FIG. 1 shows a basic known tubular LED lamp.
Figures 2A, 2B, 2C:
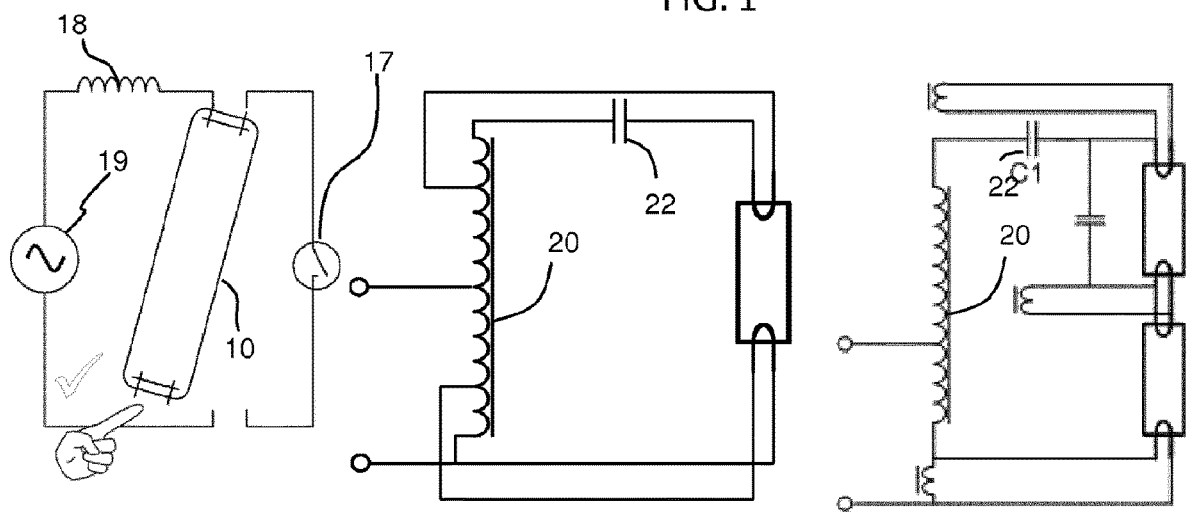
FIGS. 2A-C show three examples of electromagnetic ballast.
Figure 3:
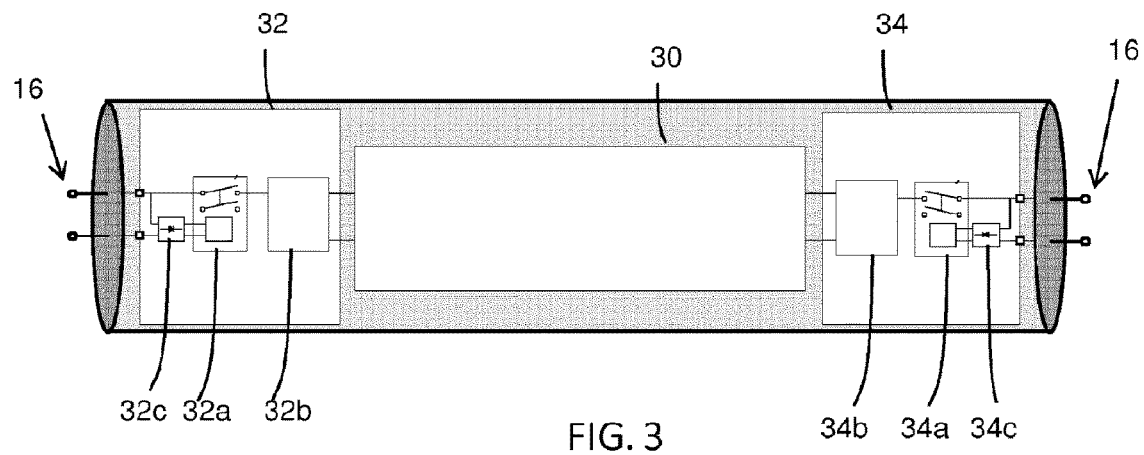
FIG. 3 shows a first known pin safety arrangement.
Figure 4:
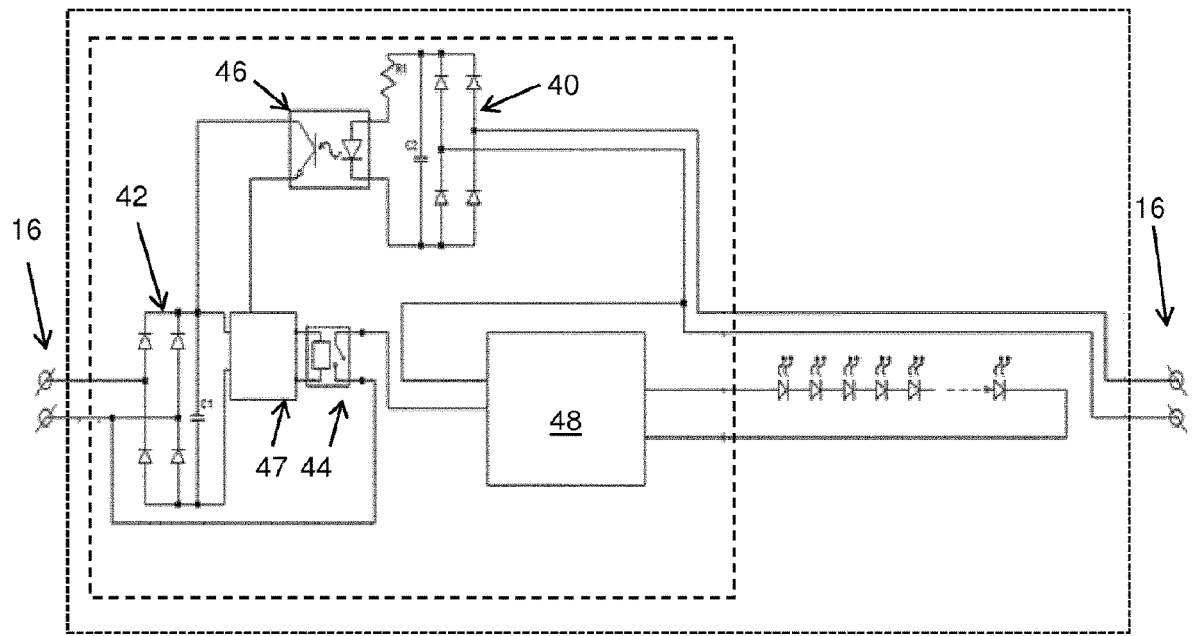
FIG. 4 shows a second known pin safety arrangement.
Figure 5:
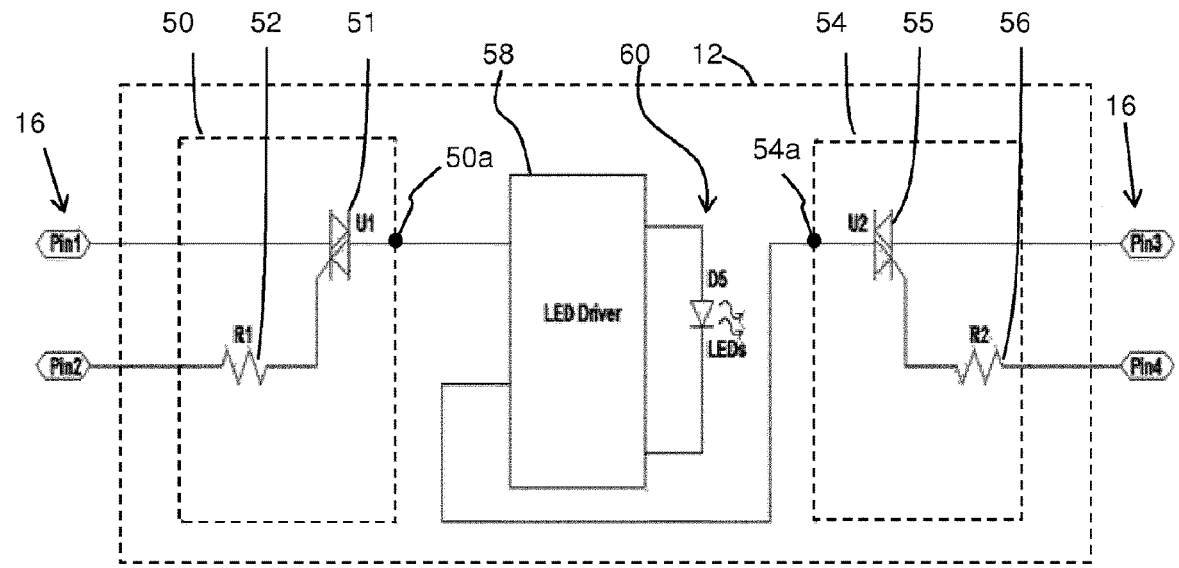
FIG. 5 shows in general form a tubular lighting device including a pin safety arrangement.

FIG. 5 shows in general form a tubular lighting device including a pin safety arrangement. The device comprises a tubular housing 12 having an elongate axis (such as shown in FIG. 1) and first and second opposite ends. Each end comprises two projecting electrical connection pins 16.

A first pin safety circuit 50 is electrically connected to the connecting pins at the first end and has a first power supply output terminal 50a used for supplying power to an LED driver circuit 58.

A second pin safety circuit 54 is electrically connected to the connecting pins at the second end and has a second power supply output terminal 54a.

An LED arrangement 60 is driven by the LED driver circuit 58. The arrangement may be applied to other solid state lighting technologies.

The pin safety circuits each comprise a TRIAC switch 51, 55 having an input terminal (shown connected to pin 1 and pin 3), an output terminal and a gate terminal (shown connected to pin 2 and pin 4). Thus, the input terminal is connected to one of the connection pins and the gate terminal is connected to the other of the connection pins. The output terminal is connected to the respective power supply output terminal 50a, 54a.

The TRIAC forms a closed switch under the control of the signal applied to the gate. In particular, a voltage between the input terminal and the gate terminal triggers the TRIAC to close by causing a gate current to be generated.

The gate terminal of the TRIAC 51, 55 of each pin safety circuit is connected to the connection pin through a resistor 52, 56.

The voltage between the pins, and which is used to gate the TRIAC is a heating voltage generated by the ballast, and is for example a 3.6V rms signal. The device is thus suitable for use with a fluorescent lighting ballast in the form of a rapid start electromagnetic ballast, or in the form of a high frequency ballast with filament heating.

A rapid start EM ballast constantly provides this 3.6V rms AC heating voltage to the lamp. More advanced electronic ballast such as programmed start type ballasts provide different heating power during a preheat phase and a steady state phase. Some ballasts also switch off heating in the steady state to save energy.

Figure 6:
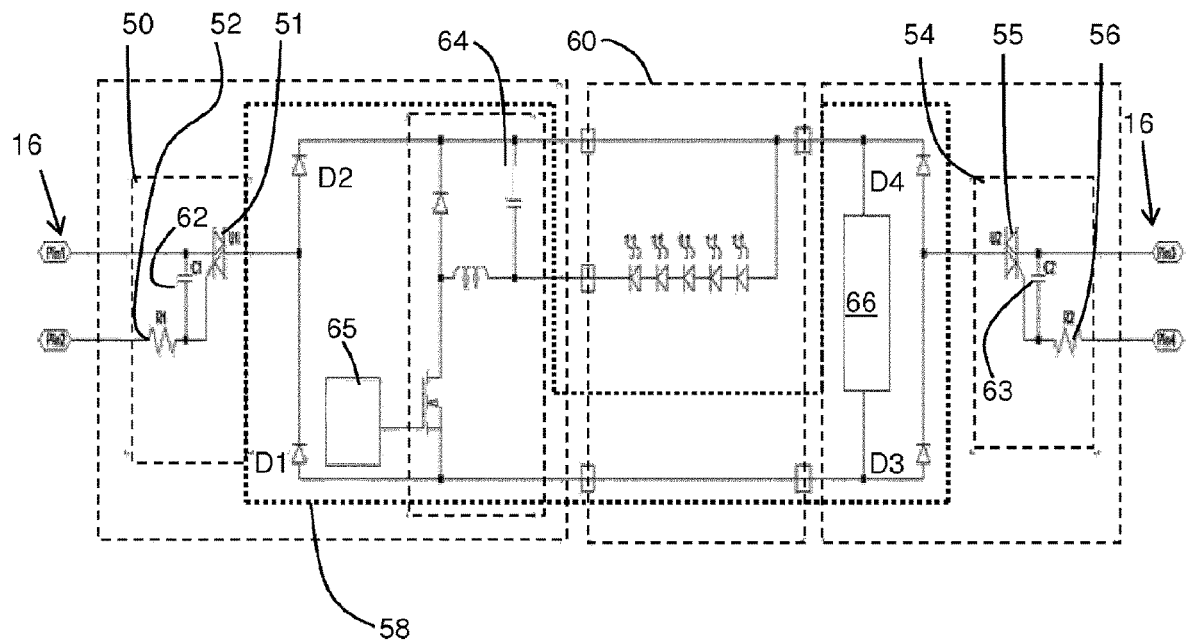
FIG. 6 shows one example of a more detailed implementation of the arrangement of FIG. 5.

FIG. 6 shows a detailed implementation of the circuitry.

In addition to the components shown in FIG. 5, the pin safety circuits each include an optional capacitor and/or resistor 62, 63. The capacitors and/or resistor 62, 63 are used to avoid unintended triggering of the TRIAC.

When the lamp is energized, the filament heating voltage between the two pins causes a current to flow in the gate of the TRIACs via the resistors 52, 56. The resistance selected relates to the sensitivity of the TRIAC gate. A more sensitive gate requires a lower current and thus a higher ohmic resistor can be used (this saves energy). For example, for a sensitive gate of 3 mA type, a 200 Ohm resistor may be chosen.

In the case of an EM (mains frequency) ballast, the TRIAC needs to be triggered every half mains cycle because it stops conducting at the zero crossing, when the TRIAC body current drops below the holding current.

If the heating voltage is continuously applied, as is the case for basic low frequency EM rapid start ballasts, then the TRIAC is indeed triggered each half cycle.

In the case of electronic (high frequency) ballasts, the TRIAC keeps conducting once triggered, because the TRIAC generally does not stop conducting at the zero crossing of a high frequency current (for example above 20 kHz). This makes it possible to use a higher resistance again to save energy. As a result, for a programmed start ballast, where the heating voltage is only applied during start up, the TRIAC can be still be maintained in a conducting state even when the heating voltage is switched off in the steady state. Some electronic ballast designs apply a heating voltage constantly in the steady state, in the same way as a rapid start EM ballast, and other electronic ballast designs only apply heating during a preheat phase and switch off or switch to a lower heating current afterwards.

FIG. 6 shows that the lighting device further comprises a diode rectifier (D1 to D4) to convert the AC input to a DC. A power stage 64 and a controller 65 are also provided to convert the DC voltage to a suitable current for driving the LED arrangement 60. The power stage 64 is for example a switch mode converter such as a buck converter. The circuit also includes an EMI filter 66.

A 4-Quadrant TRIAC is preferred, because the phase relation between the filament voltage and the lamp voltage is undefined. The phase shift depends on the compensation capacitor and also on the leakage inductance of the rapid start ballast. It also depends on the how the lamp is connected to the luminaire and therefore the ballast. If the connections to the two pins are swapped, this causes a 180 degree phase shift.

Figure 7:
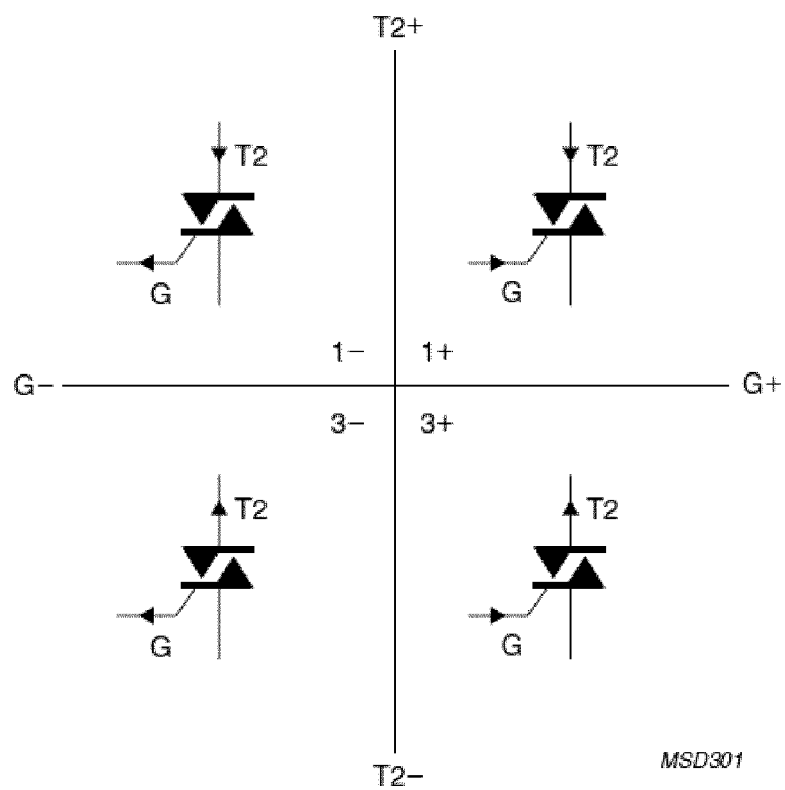
FIG. 7 shows the operation of a four quadrant TRIAC which may be used in the device of FIG. 5.

A 4-Quadrant TRIAC can be triggered in any of the 4 quadrants as shown in FIG. 7. Each quadrant is for a different combination of output (terminal 2, T2) and gate (G) voltage polarities relative to the input voltage (applied to terminal 1).

It is desired that that the TRIAC achieves near 180 degree conduction angle so that it conducts all the time. However, in reality a small time delay is needed to trigger the TRIAC after a zero crossing. The worst case is that the filament voltage is in phase with the lamp voltage. Because the sinusoidal filament voltage has to rise from zero to a certain value to reach the required triggering gate current, e.g. 3 mA, there will be a small phase cut in the lamp current.

The tubular lighting device described above is specifically for use with a ballast which provides electrode heating, such as the rapid start EM ballast, or electronic ballast with electrode heating.

Figure 8:
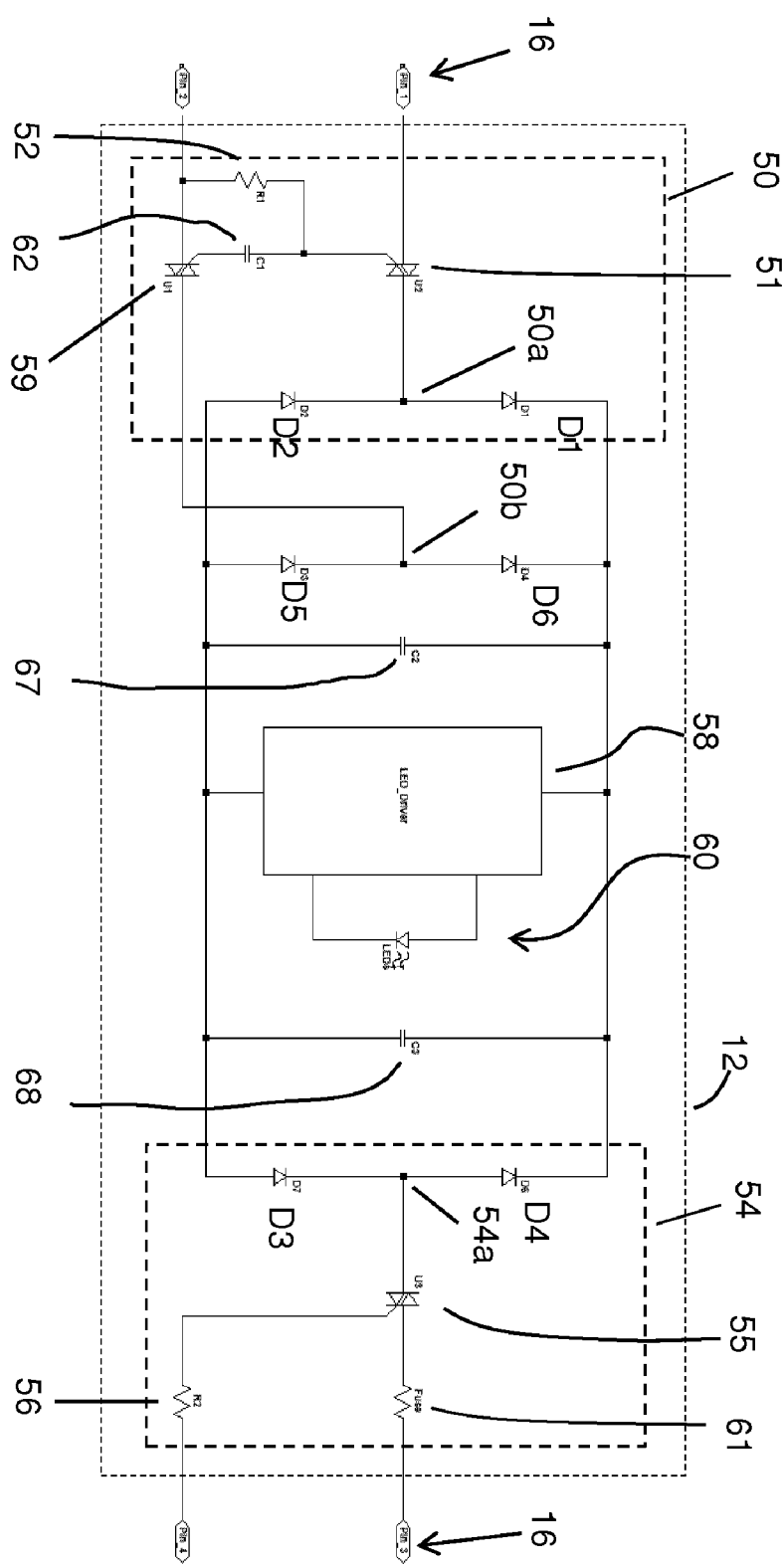
FIG. 8 shows a further example of a more detailed implementation of the arrangement of FIG. 5.

FIG. 8 shows a further example of a more detailed implementation of the arrangement of FIG. 5. The tubular lighting device can be used either with an EM ballast and/or directly to the mains. The tubular lighting device includes a pin safety arrangement. The device comprises a tubular housing 12 having an elongate axis (such as shown in FIG. 1) and first and second opposite ends. Each end comprises two projecting electrical connection pins 16.

A first pin safety circuit 50 is electrically connected to the connecting pins at the first end and has a first power supply output terminal 50a used for supplying power to an LED driver circuit 58.

A second pin safety circuit 54 is electrically connected to the connecting pins at the second end and has a second power supply output terminal 54a.

An LED arrangement 60 is driven by the LED driver circuit 58. The arrangement may be applied to other solid state lighting technologies.

The first pin safety circuit 50 comprises two TRIAC switches 51, 59 having an input terminal (shown connected to connection pin 1 and connection pin 2), an output terminal and a gate terminal (the gate terminal of the TRIAC 51 is connected to the gate terminal of TRIAC 59). The output terminal of TRIAC 51 is connected to the respective power supply output terminal 50a, and the output terminal of TRIAC 59 is connected to the respective power supply output terminal 50b.

The TRIAC forms a closed switch under the control of the signal applied to the gate. In particular, a voltage between the input terminal and the gate terminal triggers the TRIAC to close by causing a gate current to be generated.

The gate terminal of the TRIAC 51, 59 of the first pin safety circuit 50 is connected to the connection pin 2 through a resistor 52. In addition to the components shown in FIG. 5, the first pin safety circuit 50 includes a capacitor 62. The trigger circuit for TRIAC 51 and TRIAC 59 comprises a low impedance path via resistor 52 and a high impedance path via capacitor 62 (at the mains frequency).

The second pin safety circuit 54 comprises a TRIAC switch 55, having an input terminal (shown connected to connection pin 3), an output terminal and a gate terminal (shown connected to connection pin 4). The output terminal of TRIAC 55 is connected to the respective power supply output terminal 54a.

The TRIAC forms a closed switch under the control of the signal applied to the gate. In particular, a voltage between the input terminal and the gate terminal triggers the TRIAC to close by causing a gate current to be generated.

The gate terminal of the TRIAC 55 of the second pin safety circuit 54 is connected to the connection pin 4 through a resistor 56.

The connection pins 3 and 4 (which are the connected to the second pin safety circuit 54) are connected at one end of the tubular housing 12 and in this embodiment are considered the non-mains input side.

The connection pins 1 and 2 (which are connected to the first pin safety circuit 50) are connected to the other end of the tubular housing 12 and in this embodiment are considered the mains input side.

When an EM ballast is connected to both sides of the tubular lighting device, the filament windings of the ballast will supply a heating voltage, for example a 3.6V rms signal which is used to gate TRIAC 51 and TRIAC 55 via current limiting impedance resistors 52, 56. Due to the low voltage across the filament windings (typically 3.6V rms) the current in capacitor 62 should be below the threshold current required at gate terminal of TRIAC 59 which will prevent the TRIAC 59 from switching on. Hence, the bridge diodes D3 and D4 do not conduct. In a preferred embodiment, resistor 52 is either a current dependent impedance such as a fusistor, or a temperature dependent impedance such as a positive temperature coefficient (PTC) resistor.

In the case where the installation allows a direct mains voltage to be connected to the tubular lighting device via the mains input side (connection pins 1 and 2), the current in resistor 52 will be greatly reduced or even stopped. The resistor 52 can be a resistor, capacitor or inductor. In a preferred embodiment, the resistor 52 is a current dependent fusistor or a temperature dependent PTC resistor. The current through capacitor 62 will turn on both TRIAC 51 and TRIAC 59, the mains power will then power the rest of the LED driver 58 through the rectifier bridge D1-D4. If the mains power is accidently connected to the non-mains input side (via connection pins 3 and 4), an overcurrent occurs and the fuse 61 will protect the circuit.

The resistor 56 can also be a resistor, capacitor or an inductor. It may be preferable to use a capacitor or inductor rather than a resistor due to the fact that a capacitor or an inductor will phase shift the current by 90° away from the filament voltage. This is preferable because when the filament voltage is passing through zero, the current in resistor 52, 56 is at peak and this is the optimum time to trigger the TRIACs. Hence using a capacitor or inductor as the impedance can reduce the rms value of the gate current thus reducing the losses compared to using a resistor as the impedance.

The LED arrangement 60 may be a strip of LEDs on an internal printed circuit board, or there may be discrete surface mount LEDs. The housing has a transparent or partially transparent outer wall or outer wall portion. The driver circuit typically provides a current-regulated output to the LED arrangement.

Figure 9:
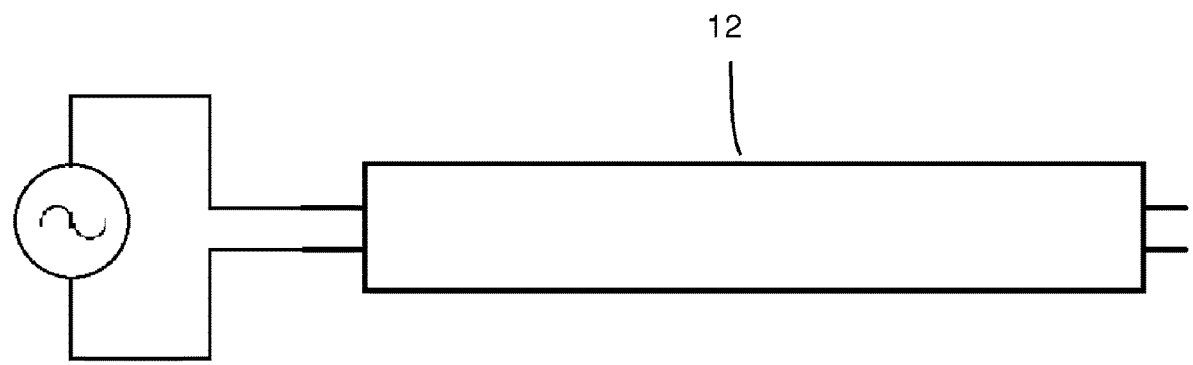
FIG. 9 shows a tubular lighting device connected directly to the mains.

FIG. 9 shows a circuit schematic of when a tubular lighting device comprising a tubular housing 12 is connected at one end directly to the mains.

Figure 10:
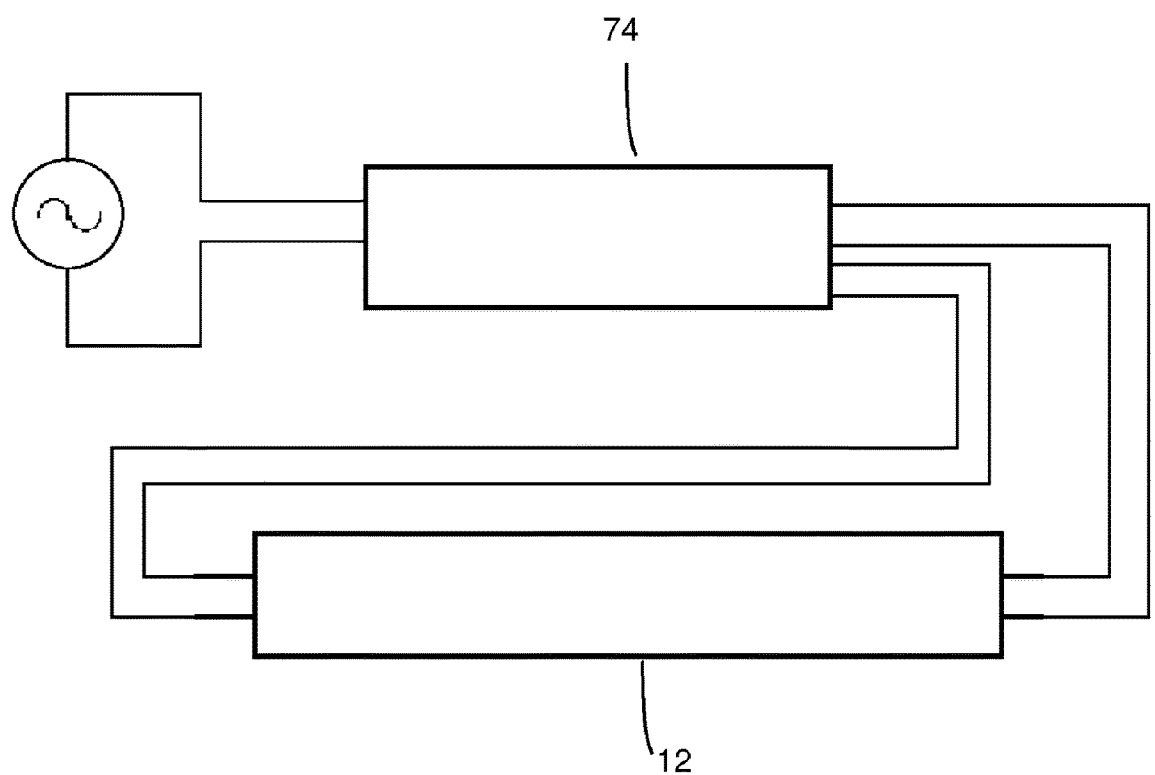
FIG. 10 shows a tubular lighting device connected to an electromagnetic ballast.

FIG. 10 shows a circuit schematic of when a tubular lighting device comprising a tubular housing 12 is connected at both ends to an electromagnetic or electronic ballast 74.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A tubular lighting device, comprising:
a tubular housing having an elongate axis and first and second opposite ends, each of the first and second opposite ends comprising two projecting electrical connection pins;
a first pin safety circuit electrically connected to the two projecting electrical connecting pins at the first opposite end and having a first power supply output terminal;
a second pin safety circuit electrically connected to the connecting pins at the second end and having a second power supply output terminal;
a solid state lighting arrangement; and
a lighting driver circuit for driving the solid state lighting arrangement, the lighting driver circuit being connected to the first and second power supply output terminals for receiving power from the first and second pin safety circuits,
wherein the pin safety circuits each comprise a TRIAC switch having an input terminal, an output terminal and a gate terminal, wherein the input terminal is connected to one of the two projecting electrical connection pins, the gate terminal is connected to the other of the connection pins and the output terminal is connected to a respective power supply output terminal, wherein the TRIAC switch is adapted to form a closed switch in response to a voltage between the input terminal and the gate terminal, and
wherein the gate terminal of the TRIAC switch of each of the first and second pin safety circuit is connected to a respective connection pin through a resistor.

2. A device as claimed in claim 1, wherein the lighting driver circuit further comprises a rectifier, wherein the rectifier comprises an input and an output, the input of the rectifier being connected to at least one of the first pin safety circuit and the second pin safety circuit, the output of the rectifier being connected to a switch mode power converter.

3. A device as claimed in claim 1, wherein the lighting driver circuit (58) further comprises an EMI filter (66).

4. A device as claimed in claim 1, wherein the TRIAC switch of each of the first and second pin safety circuit comprises a four quadrant TRIAC.

5. A device as claimed in claim 1, wherein the first pin safety circuit further comprises an additional TRIAC switch having an input terminal, an output terminal and a gate terminal, wherein the input terminal of the additional TRIAC switch is connected to the other one of the connection pins at the first end, the gate terminal is connected to the gate terminal of the first TRIAC switch and the output terminal is connected to a further respective power supply output terminal, wherein the TRIACs are adapted to form a closed switch in response to a voltage between the input terminal and the gate terminal.

6. A device as claimed in claim 5, wherein the lighting driver circuit further comprises a rectifier, wherein the rectifier comprises an input and an output, the input of the rectifier being connected to at least one of the first pin safety circuit and the second pin safety circuit, the output of the rectifier being connected to a switch mode power converter, and wherein the lighting driver circuit comprises a further rectifier coupled in parallel to the series connection of rectifier D1 and rectifier D2.

7. A device as claimed in claim 6, wherein the resistor comprises a fusistor.

8. A device as claimed in claim 6, wherein the resistor comprises a PTC resistor.

9. A device as claimed in claim 1, wherein the solid state lighting arrangement comprises an LED arrangement and the lighting driver circuit comprises an LED driver.

10. A lighting fixture comprising:
a fluorescent lighting electronic ballast, a fluorescent lighting electromagnetic ballast, or a lighting fixture without a ballast; and
the tubular lighting device as claimed in claim 1 connected to the fluorescent lighting ballast.

11. The lighting fixture as claimed in claim 10, wherein the fluorescent lighting ballast comprises an electronic ballast with filament heating.

12. A tubular lighting device, comprising:
a tubular housing having an elongate axis and first and second opposite ends, each of the first and second opposite ends comprising two projecting electrical connection pins;
a first pin safety circuit electrically connected to the two projecting electrical connecting pins at the first opposite end and having a first power supply output terminal;
a second pin safety circuit electrically connected to the connecting pins at the second end and having a second power supply output terminal;
a solid state lighting arrangement; and
a lighting driver circuit for driving the solid state lighting arrangement, the lighting driver circuit being connected to the first and second power supply output terminals for receiving power from the first and second pin safety circuits,
wherein the pin safety circuits each comprise a TRIAC switch having an input terminal, an output terminal and a gate terminal, wherein the input terminal is connected to one of the two projecting electrical connection pins, the gate terminal is connected to the other of the connection pins and the output terminal is connected to a respective power supply output terminal, wherein the TRIAC switch is adapted to form a closed switch in response to a voltage between the input terminal and the gate terminal, and wherein each pin safety circuit further comprises a capacitor and/or resistor between the input terminal and the gate terminal of the TRIAC switch.

* * * * *